United States Patent [19]

Wiegand

[11] 3,820,090

[45] June 25, 1974

[54] BISTABLE MAGNETIC DEVICE

[75] Inventor: John Richard Wiegand, Valley Stream, Long Island, N.Y.

[73] Assignees: Milton Vlinsky, Plainfield, N.J.; John R. Wiegund, Valley Stream, N.Y. ; part interest to each

[22] Filed: Apr. 25, 1972

[21] Appl. No.: 247,356

Related U.S. Application Data

[63] Continuation-in-part of Ser. No. 5,631, Jan. 26, 1970, Pat. No. 3,602,906, and a continuation-in-part of Ser. No. 5,632, Jan. 26, 1970, abandoned, and a continuation-in-part of Ser. No. 86,169, Nov. 2, 1970, abandoned, and a continuation-in-part of Ser. No. 137,567, April 26, 1971, abandoned, and a continuation-in-part of Ser. No. 173,070, Aug. 19, 1971, abandoned.

[52] U.S. Cl.... 340/174 ZB, 340/174 PM, 340/174 VC
[51] Int. Cl. .......................................... G11c 11/06
[58] Field of Search. 340/174 PM, 174 VC, 174 ZB

[56] References Cited

UNITED STATES PATENTS

| | | | |
|---|---|---|---|
| 3,134,096 | 5/1964 | Bartkus et al. | 340/174 PM |
| 3,317,742 | 5/1967 | Guerth | 340/174 PM |
| 3,370,979 | 2/1968 | Schmeckenbecher | 340/174 ZB |
| 3,451,793 | 6/1969 | Matsushita | 340/174 ZB |
| 3,757,754 | 9/1973 | Wiegand | 123/148 E |

*Primary Examiner*—James W. Moffitt
*Attorney, Agent, or Firm*—Ryder, McAulay, Fields, Fisher & Goldstein

[57] ABSTRACT

A bistable ferromagnetic wire of generally uniform composition having a central relatively "soft" core portion and an outer relatively "hard" magnetized shell portion with relatively low and high coercivity respectively and whereby (a) the magnetized shell portion is operable for magnetizing the core portion in a first direction, (b) the magnetization of the core portion is reversible by application of a separate magnetic field and (c) the shell portion is operable to remagnetize the core portion in the first direction upon removal of the separate magnetic field.

32 Claims, 13 Drawing Figures

BISTABLE MAGNETIC DEVICE

This is a continuation-in-part application of the following copending applications:

a. Ser. No. 5,631, filed Jan. 26, 1970, entitled "Multiple Pulse Magnetic Memory Unit" and now U.S. Pat. No. 3,602,906;
b. Ser. No. 5,632, filed Jan. 26, 1970, entitled "Coded Magnetic Card and Reader", now abandoned;
c. Ser. No. 86,169, filed Nov. 2, 1970, entitled "Self-Nucleating Magnetic Wire", now abandoned;
d. Ser. No. 137,567, filed Apr. 26, 1971, entitled "Self-Nucleating Magnetic Wire", now abandoned; and
e. Ser. No. 173,070, filed Aug. 19, 1971, entitled "Self-Nucleating Magnetic Wire", now abandoned.

This application incorporates the subject matter disclosed in U.S. Pat. applications Ser. No. 5,631 and Ser. No. 5,632, set forth above.

BACKGROUND OF THE INVENTION

The present invention is in a bistable magnetic wire.

It is a principal aim of the present invention to provide a magnetic switching device operable to generate a readout signal with a high signal-to-noise ratio.

It is another aim of the present invention to provide a new and improved self-resetting magnetic switching device.

It is another aim of the present invention to provide a new and useful magnetic storage element.

It is another aim of the present invention to provide a magnetic wire switching device useful in magnetic memory circuits such as, for example, magnetic shift registers and memory matrices.

It is a further aim of the present invention to provide a magnetic wire switching device settable by momentary application of a suitable magnetic field for generating a readout signal as the applied magnetic field is withdrawn having a high signal-to-noise ratio and an amplitude substantially independent of the rate of withdrawal of the applied magnetic field.

It is another aim of the present invention to provide a magnetic wire switching device with open loop or generally rectangular hysteresis loop characteristics in an H magnetization curve.

It is still further an aim of the present invention to provide a low cost magnetic wire switching device meeting one or more of the foregoing aims.

It is another aim of the present invention to provide a method of making a magnetic wire switching device of the type described.

It is a further aim of the present invention to provide a method of making a magnetic wire switching device from conventional ferromagnetic wire stock.

Other aims will be in part obvious and in part pointed out in more detail hereinafter.

A better understanding of the invention will be obtained from the following detailed description and the accompanying drawings of illustrative application of the invention.

BRIEF DESCRIPTION OF THE INVENTION

In brief, this invention is in a two domain magnetic device, preferably in the form of a wire. In the preferred form, the core of the wire is magnetically soft; specifically it has a relatively low coercivity. The shell surrounding the core is relatively magnetically hard; specifically, it has a relatively high coercivity. The result is a two domain magnetic device in which the direction of magnetization of the core can be switched at a high rate to provide, in a pick-up coil, a pulse that has a high signal to noise ratio.

This two domain wire can be prepared by twisting a ferromagnetic wire back and forth about its axis. The consequently greater straining of the circumference than of the core, work hardens the circumference to provide relatively magnetically hard shell and soft core.

In use, the wire is magnetized in an axial direction by being subjected to a magnetic field. When the magnetizing field is removed, the result is a magnetized wire in which the shell is magnetized in a first axial direction and in which the relatively magnetically soft core is magnetized in the opposite axial direction by virtue of the bias on the core due to the shell. In such a state, the core provides a return path for the magnetic flux generated by the shell.

A sufficiently strong outside magnetic field in opposition to the field of the shell will switch the direction of magnetization of the core. The result is that the flux from the shell completes its path outside of the wire. Accordingly, there is a net change in the flux outside of the wire and an appropriately placed pick-up coil will generate a pulse.

Similarly, when the external field is reduced sufficiently so that the bias due to the shell on the core exceeds the bias due to the external field, the shell will recapture the core, thereby switching the direction of magnetization at the core and causing the flux path due to the magnetization of the shell to be completed in the core. The resultant change in the magnetic field outside of the wire will also be picked-up by an appropriately placed pick-up coil to produce a pulse.

DESCRIPTION OF THE PREFERRED EMBODIMENTS

In accordance with one embodiment of the present invention, it has been discovered that a wire of a suitable ferromagnetic material having a generally uniform composition and for example formed by a drawing process, may be treated to form a magnetic central portion (hereinafter referred to as a core) and a magnetic outer portion (hereinafter referred to as a shell) having different net magnetic characteristics and which cooperate to form an extremely effective self-nucleating magnetic wire.

Figure 1:
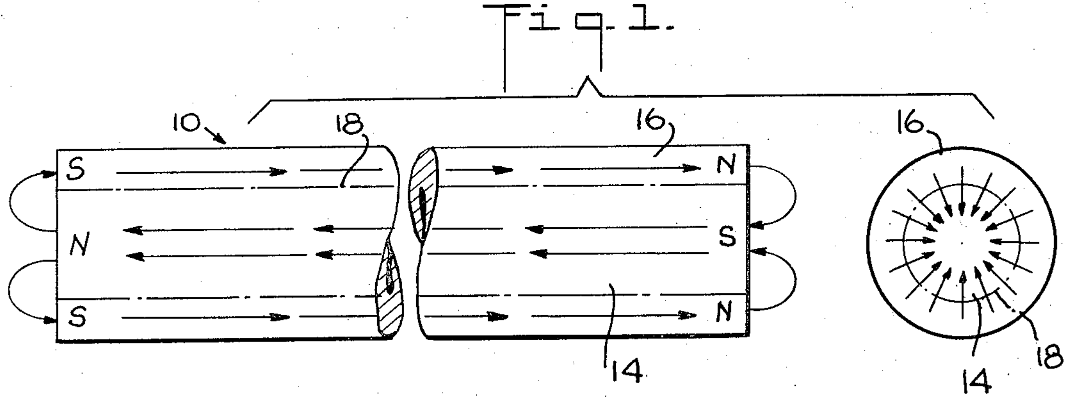
FIG. 1 shows enlarged generally diagrammatic representations including a longitudinal view, partly broken away, and an end view, of one embodiment of a magnetic wire of the present invention.

An embodiment 10 of such a self-nucleating magnetic wire is shown in FIG. 1 and comprises a drawn wire of a suitable ferromagnetic material having a generally circular cross section. It is preferred that the wire has a true round cross section or as close to true round as can be reasonably obtained. The magnetic wire 10 may, for example, be five-eighths inch long, have a diameter of 0.012 inches and be made of a commercially available wire alloy having 48 percent iron and 52 percent nickel. The wire is processed to form a relatively "soft" magnetic wire core 14 having relatively low magnetic coercivity and a relatively "hard" magnetic wire shell 16 having relatively high magnetic coercivity. Accordingly, the shell is effective to magnetically bias the magnetic core 14.

The term "coercivity" is used herein in its traditional sense to indicate the magnitude of the external magnetic field necessary to bring the net magnetization of a magnetized sample of ferromagnetic material to zero.

The relatively "soft" core 14 is magnetically anisotropic with an easy axis of magnetization substantially parallel to the axis of the wire. The relatively "hard" shell 16 is also magnetically anisotropic with an easy axis of magnetization substantially parallel to the axis of the wire. In FIG. 1, the shell 16 is magnetized to form north and south poles at its opposite ends. The relatively "hard" shell 16 has a coercivity sufficiently greater than that of the relatively "soft" core 14 to couple the core to the shell 16 by causing the net magnetization of the core 14 to align in an axial direction opposite to the axial direction of the net magnetization of the shell 16 as indicated in FIG. 1. When the core 14 is thus coupled to the shell, the core 14 forms a magnetic return path or shunt for the shell 16 as shown by the flux lines illustrated in FIG. 1 and a domain wall interface 18 is formed in the wire 10 between the oppositely extending lines of flux therein. The domain wall interface 18 defines the boundary between the core and shell. For simplifying the understanding of the magnetic wire 10 this domain wall 18 boundary may be thought of as having a cylindrical shape as shown in FIG. 1 although it is believed that the domain wall interface occurs along a rather irregular and indefinite magnetic transition zone in the wire. The domain wall has a thickness in the order of one micron. Thus, for the purpose of simplifying the understanding of the operation of the wire 10, the core 14 and shell 16 may be considered to be contiguous, ignoring the extremely thin magnetic transition zone that is the domain wall interface when the magnetic core 14 is magnetically coupled to the shell 16.

The core 14 has a cross-sectional area which is preferably related to the cross-sectional area of the shell 16 so that the shell 16 is effective to couple the core 14 (so that the direction of the net magnetization of the core is opposite to the direction of the net magnetization of the shell 16 and thus the core 14 provides an effective return path for most of the magnetic flux of the shell 16). The core will be deemed, herein, to be captured by the shell when the FIG. 1 coupling arrangement exists.

The net magnetization of the shell may be in either axial direction. In the absence of an external field, the higher coercivity shell will then capture the core so that the net magnetization of the core will be opposite in direction to that of the shell.

An external field can be employed to overcome the effect of the shell and to cause the magnetization of the core to switch. For example, if a sufficiently strong bar magnet is brought close to the wire segment 10, in a parallel orientation to the wire 10 and with its magnetic field polarity in opposition to the polarity of the wire shell 16, this bar magnet will capture the core 14 to reverse the direction of the net magnetization in the core 14. The switching will occur when the field strength at the core 14 from the external bar magnet exceeds in absolute magnitude the field strength at the core 14 from the shell 16. The amount by which the bar magnet field strength must exceed the shell field strength will depend on the magnitude of the core magnetic anisotropy.

The net magnetization of the core 14 is switched either (a) when an external field in opposition to the shell field provides a strong enough bias on the core to capture the core from the shell or (b) when an external field in opposition to the shell is reduced in magnitude sufficiently so that the shell captures the core from the external field. In either case, this core net magnetization reversal occurs through the process of the nucleation of a magnetic domain at one, or both ends, of the wire core and propagation (that is, movement) of a "transverse" domain wall (not the cylindrical domain wall 18) along the length of the wire. More explicitly, the transverse domain wall that is propagated during switching extends across the diameter of the core and is believed to be somewhat conical in shape. This somewhat conically shaped domain wall travels axially along the core during the process of switching and exists only during the process of switching. After this conically shaped domain wall has terminated the domain wall 18 will either have been created (when the shell captures the core from an external field) or will have been eliminated (when an external field captures the core from the shell). It should be noted that when an external field in opposition to the shell has captured the core from the shell the direction of magnetic flux of the core will be essentially the same as the direction of the magnetic flux of the shell and thus in that state there will be no domain wall.

In general, the rate of propagation of the domain wall along the core 14 is a function of the composition, metallurgical structure, diameter and length of the wire 10 and of the strength of the magnetic field. The time involved for such nucleation and propagation is in general a function of the rate of propagation of the domain wall and the length of the wire 10.

During this process where the net magnetization of the core switches, the contribution to the external field by the shell changes materially in magnitude and rapidly in time. The result is that an appropriately placed pick-up coil will detect (read) the core reversal through generation of a pulse in the pick-up coil.

When the shell captures the core from an external field, the net change in the external field will be due to the fact that the shell field will have a path through the core and thus will be vectorially subtracted from the external field, resulting in a larger net field at the pick-up coil. Similarly, when an external field captures the core from a shell, the magnetic field due to the shell will be completed external to the wire 10 and thus will be vectorially added to the external field, resulting in a smaller net field at the pick-up coil. The result is that the direction of the flux in the pick-up coil will differ depending upon which way the core magnetization is switched.

Figure 2:
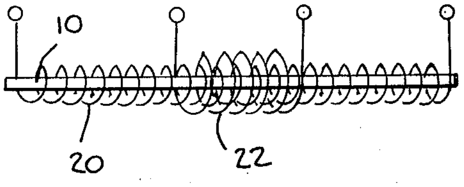
FIGS. 2, **2*a*, 3, 3*a*, 4 and 5 show enlarge generally diagrammatic representations of exemplary readout systems employing the magnetic wire of FIG. 1**.
Figure 3:
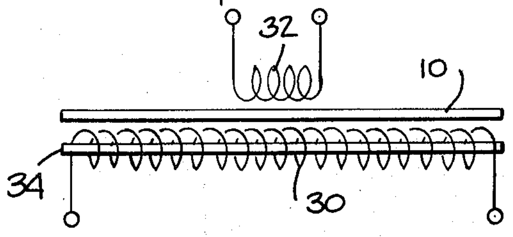

Also it has been found that for some applications (for example, as shown in FIGS. 2 and 3) the wire can nucleate at only one end if the wire is more than some particular length. For example, a ferromagnetic wire composed of an alloy of 48 percent iron and 52 percent nickel and having a 0.012 inch diameter and processed as hereinafter described has such a maximum preferred length of approximately 0.625 inches (i.e., approximately 50 × diameter). The same wire excepting with a diameter of 0.030 inches has such a critical length of approximately 1.50 inches (i.e., approximately 50 × diameter).

Also, for example, a 0.550 inch length of the aforementioned 0.012 inch diameter wire has been found to be a useful size for the applications shown in FIGS. 2, 2*a*, 3 and 3*a* and in one sample, the shell has been found to have a coercivity of approximately 23 oersteds and the core a coercivity that is estimated at approximately 8 oersteds. Operationally, this means that an external field of 23 oersteds is required to reverse the direction of net magnetization of the shell. It also means that when the core is captured by an external field, as the external field is reduced, the core is captured by the shell when the resultant field on the core drops below 8 oersteds.

FIGS. 2 through 5 illustrate readout systems which exemplify the operation of the magnetic wire 10. In the readout system of FIG. 2 there is shown mounted in inductive relationship with the wire 10 a drive coil 20 shown encircling substantially the full length of the wire 10 and a pick-up or read coil 22 shown encircling a portion of the wire 10. An alternate embodiment shown in FIG. 2*a* has a pick-up coil 22 adjacent to the wire 10 and coiled normal to the orientation of the wire 10 and drive coil 20. The drive coil 20 may be used to premagnetize the entire wire 10 in a desired axial direction. During the de-energizing of the drive coil 20 there is a reduced field intensity of the coil 20 at which the shell 16 captures the core 14 by reversing the net magnetization of the core 14. Such core 14 capture takes place abruptly once the magnetic field intensity of the drive coil 20 is reduced sufficiently to permit nucleation of a magnetic domain wall in the core by the shell 16. This reversing of the net magnetization of the core 14 by the magnetic flux bias of the shell 16 occurs abruptly and at a rate that is substantially independent of the rate at which the field intensity due to the drive coil decreases.

Upon re-energization of the drive coil 20 to provide a sufficiently high magnetic bias on the core in opposition to the magnetic bias due to the shell 16, the direction of the net magnetization of the core will reverse. Thus alternate energization and de-energization of the drive coil 20 will cause the direction of the net magnetization at the core 14 to alternately switch as the core is alternately captured by drive coil 20 and by the shell 16.

Figure 6:
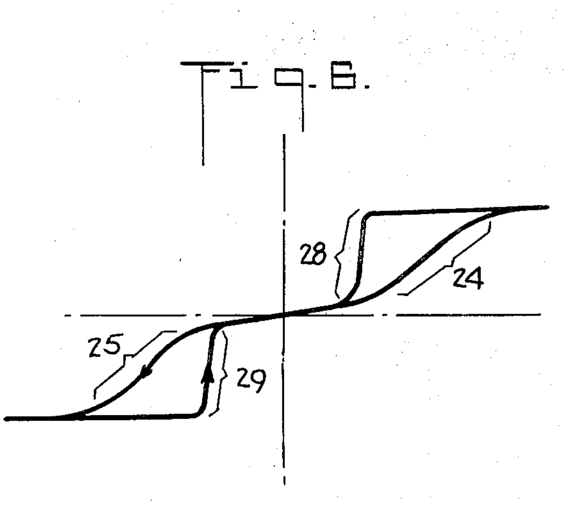
FIGS. 6 and **6*a* show M-H magnetization curves representing certain magnetic characteristics of the magnetic wire of FIG. 1**.
Figure 6A:
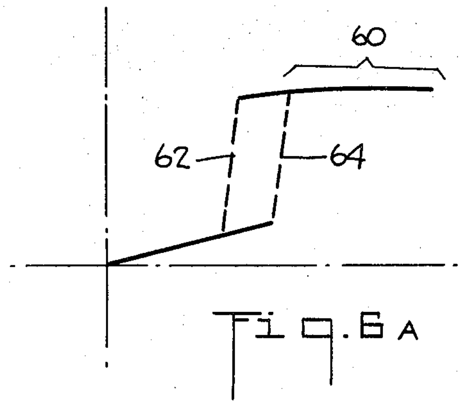
Figure 2A:
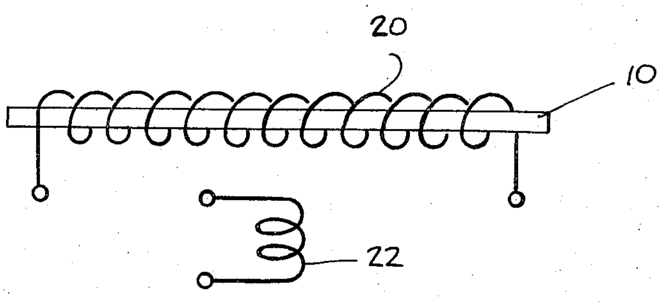

FIGS. 6 and 6*a* illustrate the magnetization curve for the FIG. 2 embodiment. Specifically, these curves illustrate the net magnetization (M) of the wire 10 as a function of the magnitude of the field (H) due to the drive coil 20. FIG. 6 illustrates the symmetric hysteresis curve in which the external biasing field H due to the drive coil 20 is swung over both positive and negative magnitudes. FIG. 6*a* illustrates the hysteresis curve in the first quadrant that is generated when the external biasing field H is varied in magnitude but is always in one direction.

First, with reference to FIG. 6, assume that the FIG. 2 embodiment starts out with an unmagnetized wire 10. Then, as the external field H (due to the drive coil 20) increases, the net magnetization M in the wire will increase in the expected S shaped fashion illustrated by the segment 24 of the curve. At saturation, the net magnetization M ceases to increase as external field strength H increases and the flat portion of the curve shown in FIG. 6 is obtained. If field strength is now reduced, the net magnetization M remains substantially constant at saturation until the shell captures the core. This capture of the core by the shell occurs very abruptly and results in a sharp immediate drop of the net magnetization of the wire 10 as indicated at 28 in FIG. 6. Further decrease in the magnitude of the field H carries the M—H curve to the left until the direction of the field reverses. After the direction of the field H reverses, the net magnetization M in the wire 10 reverses. This reversal of field H direction and net magnetization M direction puts the curve in the third quadrant. An increasing negative value for the field H results in increasing negative net magnetization M producing the curve segment 25 until saturation occurs in a fashion quite analogous to that which occurs in the first quadrant. If the negative field magnitude is now decreased (that is, brought toward zero) the net magnetization of the saturated wire remains substantially constant at saturation until the external field H has an absolute magnitude of such a nature that the shell can now capture the core. At the point where the shell captures the core there is a sharp change in the net magnetization as indicated by the curve segment 29.

In overall terms, the sections 24 and 25 of the FIG. 6 curve represent the magnetization of the entire wire 10 by the field while the segments 28 and 29 of the FIG. 6 curve represent the change in magnetization in the core which occurs because of the capture of the core by the shell. This capture occurs when the bias of the magnetic field generated by the drive coil 20 has been reduced to a point where the bias due to the shell overcomes the external field bias and the anisotropy of the core and the direction of net magnetization in the core switches.

With reference now to FIG. 6*a*, there is illustrated the situation that occurs when the current in the drive coil 20, although it varies in magnitude, is always in the same direction so that the direction of the biasing field H is always in the same direction. For the purposes of the FIG. 6*a* illustration, the initial magnetizing of the wire 10 is not illustrated. Assuming that the wire 10 has been magnetized by a strong positive biasing field H, the net magnetization M will be in the saturation region 60. As the biasing field due to the drive coil 20 is decreased in magnitude the net magnetization M for the wire 10 remains fairly constant at saturation. But when the bias of the external field (due to the drive coil 20) drops sufficiently below the bias of the field due to the shell, the shell will capture the core. At this point, there is a sharp drop in the net magnetization M as indicated at 62. After the shell has captured the core, further decrease of net magnetization M of the wire 10 providing that the direction of the external field is not reversed. An increase of the external field H after the shell has captured the core, will result in an increase in net magnetization M of the wire 10 up to a point where the external field captures the core. When the external field captures the core, there occurs an abrupt increase in the net magnetization M as indicated at 64.

A comparison with FIGS. 6 and 6*a* is instructive. It should be noted that a change in net magnetization when the shell captures the core from the external field and when the external field captures the core from the shell results in an abrupt change in net magnetization (indicated at 28, 29, 62 and 64 in the curves). By constrast with core capture, when it is the shell that is being magnetized, the change in net magnetization is much less abrupt, as indicated at 24 and 25 of the FIG. 6 curve.

Thus, by means of this invention, an abrupt change in net magnetization is provided when the direction of magnetization of the core is reversed with the consequent result that the pulse generated within the pick-up coil 22 is a sharp, high amplitude, pulse.

Figure 3A:
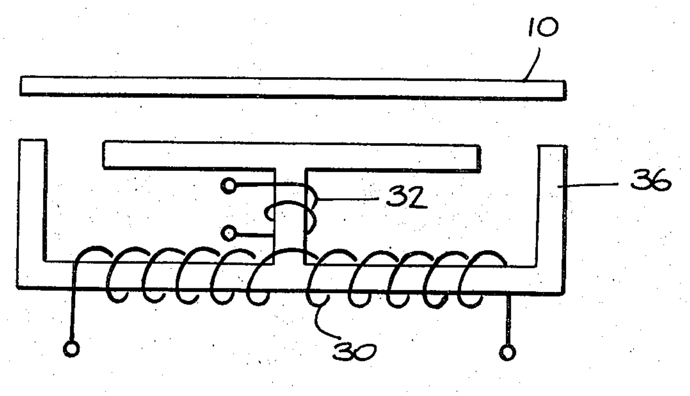

In FIG. 3 there is shown a drive coil 30 and a pick-up coil 32. The pick-up coil 32 is mounted in spaced relationship to the wire 10 (rather than encircling the wire 10 as shown in FIG. 2). A suitable soft iron core 34 may be provided for the drive coil 30. A signal is induced in pick-up coil 32 in the same manner as it is induced in pick-up coil 22 of the readout system of FIG. 2 even though the pick-up coil 32 is spaced (for example, 0.020 inches) from the wire 10. Also, it has been found that the pick-up coil 32 (or the pick-up coil 22 in the readout system of FIG. 2) may be located adjacent either end of the wire 10 (as well as centrally of the wire 10 as shown in FIGS. 2 and 3) without substantially affecting the induced signal. The further form of the FIG. 3 embodiment is shown in FIG. 3*a* where the drive coil 30 and pick-up coil 32 are wound normal to one another about perpendicular legs of a core 36 of high permeability. Such a core can be made from a 28 percent iron — 72 percent nickel alloy. The core 36 serves to direct and concentrate the flux field.

Figure 4:
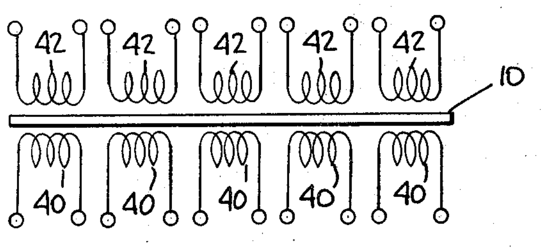

In FIG. 4 there is shown a multiple bit readout system comprising a plurality of drive coils 40 spaced along the length of the wire 10 (in which case it may be desired to employ a substantially longer wire 10 than those employed in the readout systems of FIGS. 2 and 3) and a plurality of corresponding pick-up coils 42. In such a readout system, each of a plurality of segments of the wire 10 are individually operated similar to the operation of the entire wire in the readout systems of FIGS. 2 and 3. Thus, each of the drive coils 40 is operable to magnetize an adjacent segment of the signal wire 10 in either axial direction and be subsequently individually operated to momentarily reverse the magnetism in the core of the segment to induce a signal (or signals) in the corresponding pick-up coil 42. The wire 10 may therefore be used as a memory storage element for storage of binary information in each of the segments of the wire, it being seen that each wire segment comprises a bi-stable magnetic shell and a non-destructive memory core and is self-resettable after being "read."

Figure 5:
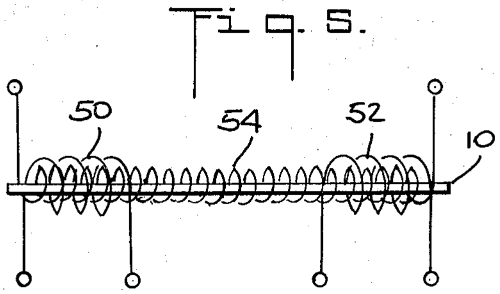

In FIG. 5 there is shown a readout system comprising a nucleating coil 50 at one end of the wire 10, a pick-up coil 52 at the opposite end of the wire 10 and a propagating coil 54 extending substantially the full length of the wire. The propagating coil 54 may be used to premagnetize the wire 10 and thereafter used to propagate the domain wall of a magnetic domain in the core formed by the nucleation coil 50. The pick-up coil 52 may be connected to suitable circuitry to produce a readout signal as the propagating coil 54 drives the domain wall across the pick-up coil 52 and/or upon the reverse magnetization of the core by the shell when the propagating coil 54 is de-energized.

As indicated, the magnetic wire may be formed from a commercially available wire composed of an alloy of iron and nickel. The magnetic wire could also be formed from other ferromagnetic compositions and for example, could be composed of iron and cobalt or iron, nickel and cobalt where a magnetic shell with higher coercivity and more rectangular hysteresis characteristics are desired. Where a magnetic wire having an anisotropic shell with an axial easy axis of magnetization is desired, it has been found that a wire of 48 percent and 52 percent nickel with a diameter of between 0.001 and 0.030 inches provides a satisfactory signal with a high signal-to-noise ratio and that such a wire with a diameter in the range of approximately 0.009 to 0.015 inches provides a signal with the highest signal-to-noise ratio. The latter size wire has therefore been found to be preferably in those applications where the time interval involved for "reading" the wire is relatively unimportant. In magnetic memory application of the wire (for example, in the memory system shown and described in U.S. Pat. No. 3,067,408 of William A. Barrett, Jr. dated Dec. 4, 1962 and entitled "Magnetic Memory Circuits") it is expected that a wire having a diameter of 0.001 inches or less would provide the best results.

Figure 7:
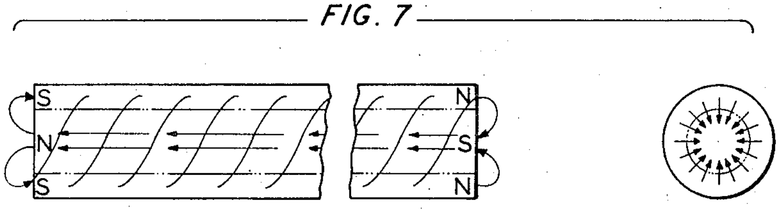
FIGS. 7 and 8 show enlarged generally diagrammatic representations similar to those shown in FIG. 1 of other embodiments of a magnetic wire of the present invention.
Figure 8:
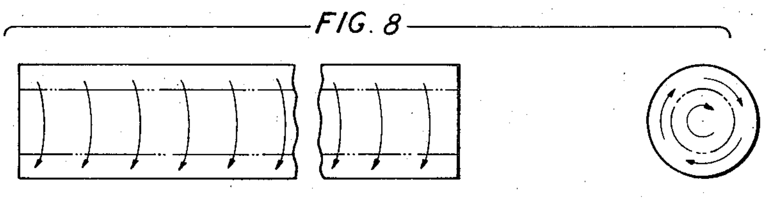

Also, where the magnetic wire is to be employed as a magnetic memory element, it may be desirable in some applications (for example, as described in the aforementioned U.S. Pat. No. 3,067,408) to form the shell of the wire with a permanent helical easy axis of magnetization as illustrated in FIG. 7 and in other applications (for example, as described in U.S. Pat. No. 3,370,979 of Arnold F. Schmeckenbecher dated Feb. 27, 1968 and entitled "Magnetic Films") to form the magnet shell of the wire with a circumferential easy axis of magnetization as illustrated in FIG. 8, in which event the wire may preferably be formed of a suitable ferromagnetic material providing a magnetic shell with rectangular hysteresis characteristics.

Figure 9:
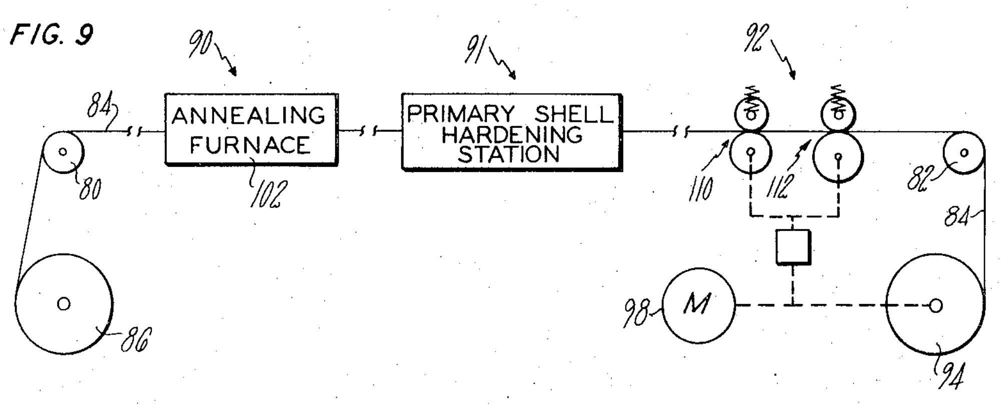
FIGS. 9 and 10 are diagrammatic representations of an exemplary system for making the magnetic wire of FIG. 1 in accordance with the present invention.

It has been discovered that a magnetic wire of the type described can be made from a conventional wire of a suitable magnetic material by a method which principally comprises a heat treating process for hardening the wire shell while maintaining the wire core relatively soft. An exemplary system for making the self-nucleating magnetic wire of FIG. 1 is diagrammatically shown in FIGS. 9 and 10. The system is shown comprising a pair of guide rollers 80, 82 for conveying a ferromagnetic wire 84 from a suitable payout reel 86 via successive wire treatment stations 90, 91 and 92 to a takeup reel 94 for feeding the wire 84 at a preestablished constant rate through the several wire treatment stations.

Figure 10:
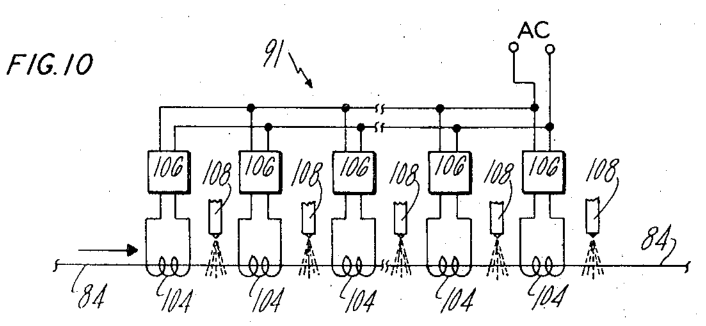

The first wire treatment station 90 comprises a suitable annealing furnace 102 for annealing the wire and making it uniformly soft and such that the wire is fully annealed as it emerges from the annealing furnace. Referring to FIG. 10, the second wire treatment station 91 provides a primary shell hardening station and comprises a plurality of spaced induction heating coils 104 (each having for example, two or three turns) having individual current controls 106. The induction heating coils 104 may be operated by an AC source of relatively low frequency (e.g., 60 cycles per second) and with a relatively high current (e.g., approximately 100 amperes) and are controlled so that the first coil provides for heating the wire 84 to a suitably high initial temperature (e.g., approximately 1,720°F for an alloy wire of 48 percent iron and 52 percent nickel) for subsequently hardening the shell of the wire, and so that the succeeding coils provide for heating the wire to successively lower temperatures which are less by approximately 100°–150°F than the temperature provided by the preceding coil. The coils 104 are suitably spaced to permit the shell of the wire to be "quenched" to a lower temperature (e.g., at least approximately 1,100°F for an alloy wire of 48 percent iron and 52 percent nickel) between the coils 104 for hardening the shell of the wire while maintaining the temperature of the wire core sufficiently hot to maintain it relatively soft. The induction heating coils 104 are preferably spaced increasingly farther apart to provide for increasingly greater cooling of the wire between coils 104. For example, with an alloy wire of 48 percent iron and 52 percent nickel having a diameter of 0.012 inches, good results are obtained by employing 10 induction heating coils 104, by feeding the wire at approximately 6 to 10 feet per second and spacing the coils at successively increasing distances to provide approximately 6 inches between the first two coils and approximately 18 inches between the last two coils.

The wire 84 is preferably "quenched" by a combination of radiation cooling and liquid spray cooling and for the latter purpose, nozzles 108 are suitably mounted between the coils to direct a very fine liquid (e.g. water) spray at a suitable controlled rate onto the wire 84. Also, the heat treatment process is preferably performed in a suitable environment which minimizes the oxidation of the wire. Of significance is that the wire heat treating process provided by the shell hardening station 91 is performed within a magnetic field (provided by the induction heating coils 104) which is generally parallel to the axis of the wire. Accordingly, the magnetic field provides for improving the axial anisotropy of the wire while the shell is being hardened.

The final wire treatment station 92 is shown comprising two spaced pairs 110, 112 of rollers which are driven by the motor 98 to have slightly different peripheral speeds for stretching the wire slightly for establishing a slight permanent strain and thereby (a) harden the shell further, (b) harden the relatively soft core slightly and (c) increase the axial anisotropy of the wire. For example, with the aforementioned alloy wire of 48 percent iron and 52 percent nickel, a wire strain of approximately 2-½ percent is found to increase the effectiveness of the magnetic wire.

A presently preferred method for forming a self-nucleating wire of the type described is constituted by (a) drawing the wire to substantially the desired size while it is maintained at a suitable elevated temperature to form a wire with a desired fine grain, and (b) work hardening the wire in a manner which provides for hardening of the wire shell while maintaining the wire core relatively soft. For example, for forming a self-nucleating wire composed of 48 percent iron and 52 percent nickel, the wire is drawn from a relatively heavy gauge wire (e.g., 1 to 1-½ inches diameter wire) by passing the wire through successive drawing stations which individually provide for a 20 percent reduction in the cross-sectional area of the wire at approximately 75 feet per minute.

By this first step of the manufacturing process, it is desired to form a wire with a fine grain not less than 6,000 grains and preferably with a grain size providing at least 8,000 grains per square millimeter and more desirably with a grain size providing 10,000 or more grains per square millimeter. It has been found that the foregoing drawing operation (of a wire alloy of 48 percent iron and 52 percent nickel and for a wire diameter of approximately 0.012 inches) produces a wire with a grain size providing approximately 10,000 grains per square millimeter. It has been found that the effectiveness of the wire as a self-nucleating wire varies inversely with the wire grain size and as the grain size is increased (from a grain size providing 10,000 grains per square millimeter) the effectiveness of the wire decreased rapidly (and such that a wire with a grain size providing approximately 6,000 grains per square millimeter has substantially less effectiveness), and as the grain size is reduced the effectiveness of the wire is improved somewhat.

More specifically, it is believed that for a given wire diameter as the grain size is reduced the slope of the portion of the M-H curve corresponding to reversal of the core magnetism increases and, therefore, the pulse is sharper. However, the resultant induced pulse width (body) in the pick-up coil is reduced. Consequently, the optimum grain size depends upon the application in which the wire is used and for many applications the preferred grain size has been determined to be 10,000 grains per square millimeter for a 0.012 diameter wire.

Following the described drawing operation, the wire is work hardened at room temperature to produce a relatively hard shell with relatively high retentivity and coercivity while maintaining a relatively soft core with relatively low retentivity and coercivity. It has been found that such results can be obtained by stretching the wire slightly (e.g., 2-½ percent for an alloy of 48 percent iron and 52 percent nickel for substantially the same reasons as the stretching step of the process of FIGS. 9 and 10) and thereafter circumferentially straining the wire. The circumferential straining step can be performed by twisting the wire back and forth with or without retaining a permanent twist. For example, it has been found that good results are obtained by twisting the wire 10 turns per linear inch of wire in one direction and then untwisting the wire the same amount in the opposite direction and such that the wire is in a generally untwisted state when the work hardening process is completed. Alternatively the twisting operation could be completed with the wire in a twisted state when for example a self-nucleating wire of the type shown in FIG. 7 is desired which provides a preference to a direction of magnetic flux.

At the present time, this method of manufacture, involving circumferential straining of the wire, is preferred and has been reduced to practice to provide wire that embodies this invention.

As will be apparent to persons skilled in the art, various modifications, adaptations and variations of the foregoing specific disclosure can be made without departing from the teachings of the present invention.

For example, the invention has been described in connection with a wire embodiment; which is the only embodiment that has been reduced to practice to the present time. However, it should be possible to develop other embodiments in which the relationship of high and low coercivity domains provide the rapid switching of the direction of magnetization of the low coercivity domain so that a pick-up coil will provide a sharp output pulse with high signal to noise ratio and a magnitude that is substantially independent of the rate at which the magnitude of the outside field is changed.

What is claimed is:

1. A unitary magnetic device having first and second magnetic portions,
 at least said first portion being capable of retaining net magnetization after being subjected to a magnetic field,
 the net coercivity of said first portion being substantially greater than the net coercivity of said second portion,
 said first portion having substantially the same chemical composition as does said second portion,
 said portions being separated solely by a magnetic domain interface when said first portion has a net magnetization in a first direction and said second portion has a net magnetization in a second direction substantially opposite from said first direction.

2. The device of claim 1 whrein said portions each have magnetic anisotropy energy, the easy axis of said anisotropy of said first portion being substantially parallel to the easy axis of said anisotropy of said second portion.

3. The device of claim 1 wherein said coercivity of said portions varies in a substantially continuous fashion throughout said portion and throughout said device.

4. The device of claim 3 wherein said portions each have magnetic anisotropy energy, the easy axis of said anisotropy of said first portion being substantially parallel to the easy axis of said anisotropy of said second portion.

5. The device of claim 1 wherein each of said portions has a generally uniform chemical composition throughout.

6. The device of claim 5 wherein said portions each have magnetic anisotropy energy, the easy axis of said anisotropy of said first portion being substantially parallel to the easy axis of said anisotropy of said second portion.

7. The device of claim 5 wherein said coercivity of said portions varies in a substantially continuous fashion throughout said portion and throughout said device.

8. The device of claim 7 wherein said portions each have magnetic anisotropy energy, the easy axis of said anisotropy of said first portion being substantially parallel to the easy axis of said anisotropy of said second portion.

9. The device of claim 1 wherein said magnetic domain interface is a domain wall.

10. The device of claim 9 wherein said portions each have magnetic anisotropy energy, the easy axis of said anisotropy of said portion being substantially parallel to the easy axis of said anisotropy of said second portion.

11. The device of claim 9 wherein said coercivity of said portions varies in a substantially continuous fashion throughout said portion and throughout said device.

12. The device of claim 11 wherein said portions each have magnetic anisotropy energy, the easy axis of said anisotropy of said first portion being substantially parallel to the easy axis of said anisotropy of said second portion.

13. The device of claim 9 wherein each of said portions has a generally uniform chemical composition throughout.

14. The device of claim 13 wherein said portions each have magnetic anisotropy energy, the easy axis of said anisotropy of said first portion being substantially parallel to the easy axis of said anisotropy of said second portion.

15. The device of claim 13 wherein said coercivity of said portions varies in a substantially continuous fashion throughout said portion and throughout said device.

16. The device of claim 15 wherein said portions each have magnetic anisotropy energy, the easy axis of said anisotropy of said first portion being substantially parallel to the easy axis of said anisotropy of said second portion.

17. A unitary magnetic wire device having shell and core magnetic portions,
 At least said shell portion being capable of retaining net magnetization after being subjected to a magnetic field,
 the net coercivity of said shell portion being substantially greater than the net coercivity of said core portion,
 said shell portion having substantially the same chemical composition as does said core portion,
 said portions being separated solely by a magnetic domain interface when said shell portion has a net magnetization in a first direction and said core portion has a net magnetization in a second direction substantially opposite from said direction.

18. The wire of claim 17 wherein said portions each have magnetic anisotropy energy, the easy axis of said anisotropy of both of said portions being substantially axial.

19. The wire of claim 17 wherein the magnitude of said coercivity of said portions varies in a substantially continuous fashion as a function of distance along the radius of said wire.

20. The wire of claim 19 wherein said portions each have magnetic anisotropy energy, the easy axis of said anisotropy of both of said portions being substantially axial.

21. The wire of claim 17 wherein each of said portions has a generally uniform chemical composition throughout.

22. The wire of claim 21 wherein said portions each have magnetic anisotropy energy, the easy axis of said anisotropy of both of said portions being substantially axial.

23. The wire of claim 21 wherein the magnitude of said coercivity of said portions varies in a substantially continuous fashion as a function of distance along the radius of said wire.

24. The wire of claim 23 wherein said portions each have magnetic anisotropy energy, the easy axis of said anisotropy of both of said portions being substantially axial.

25. The wire of claim 17 wherein said magnetic domain interface is a domain wall.

26. The wire of claim 25 wherein said portions each have magnetic anisotropy energy, the easy axis of said anisotropy of both of said portions being substantially axial.

27. The wire of claim 25 wherein the magnitude of said coercivity of said portions varies in a substantially continuous fashion as a function of distance along the radius of said wire.

28. The wire of claim 27 wherein said portions each have magnetic anisotropy energy, the easy axis of said anisotropy of both of said portions being substantially axial.

29. The wire of claim 25 wherein each of said portions has a generally uniform chemical composition throughout.

30. The wire of claim 29 wherein said portions each have magnetic anisotropy energy, the easy axis of said anisotropy of both of said portions being substantially axial.

31. The wire of claim 29 wherein the magnitude of said coercivity of said portions varies in a substantially continuous fashion as a function of distance along the radius of said wire.

32. The wire of claim 31 wherein said portions each have magnetic anisotropy energy, the easy axis of said anisotropy of both of said portions being substantially axial.

* * * * *